US007091898B2

(12) United States Patent
Arling et al.

(10) Patent No.: US 7,091,898 B2
(45) Date of Patent: Aug. 15, 2006

(54) SYSTEM AND METHOD FOR USING KEYSTROKE DATA TO CONFIGURE A REMOTE CONTROL DEVICE

(75) Inventors: Paul D. Arling, Irvine, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 310 days.

(21) Appl. No.: 10/796,598

(22) Filed: Mar. 9, 2004

(65) Prior Publication Data

US 2004/0169598 A1    Sep. 2, 2004

Related U.S. Application Data

(62) Division of application No. 10/254,363, filed on Sep. 25, 2002, now Pat. No. 6,788,241.

(51) Int. Cl.
*G08C 19/12* (2006.01)

(52) U.S. Cl. .................. 341/176; 725/38; 348/734; 340/825.22; 340/825.72; 345/173

(58) Field of Classification Search ........... 340/825.22, 340/825.72; 341/173, 176; 348/734; 725/38; 345/173
See application file for complete search history.

(56) References Cited

U.S. PATENT DOCUMENTS

| 6,195,033 | B1 * | 2/2001 | Darbee et al. | 341/176 |
| 6,633,281 | B1 * | 10/2003 | Lin et al. | 345/173 |
| 6,788,241 | B1 * | 9/2004 | Arling et al. | 341/176 |
| 6,829,512 | B1 * | 12/2004 | Huang et al. | 700/65 |

\* cited by examiner

*Primary Examiner*—Albert K. Wong
(74) *Attorney, Agent, or Firm*—Gary R. Jarosik

(57) ABSTRACT

A remote control device is which key use is monitored. A command key, representative of an appliance function, may be correlated to a target appliance that is determined, as a function of the monitored key use, to be the most likely intended recipient of a command to perform that appliance function. An activity key may also be programmed so as to perform a series of actions that are representative of a sequence of monitored key uses.

36 Claims, 16 Drawing Sheets

|  | TV | SAT | VCR | DVD | RCVR | etc.. |
|---|---|---|---|---|---|---|
| Play | x | x | 19 | 47 | 0 | |
| Stop | x | x | 15 | 39 | 0 | |
| Fast forward | x | x | 3 | 8 | 0 | |
| Rewind | x | x | 10 | 2 | 0 | |
| Pause | x | x | 4 | 53 | 0 | |
| Volume up | 83 | x | 0 | x | 279 | |
| Volume down | 79 | x | 0 | x | 383 | |
| Mute | 52 | x | 0 | x | 140 | |
| Channel up | 12 | 158 | 5 | 0 | 0 | |
| Channel down | 11 | 86 | 11 | 0 | 0 | |
| Input select | 77 | x | 2 | x | 15 | |

Group 1: Play, Stop, Fast forward, Rewind, Pause
Group 2: Volume up, Volume down, Mute
Group 3: Channel up, Channel down
Group 4: Input select

FIGURE 8

| Play | DVD |
|---|---|
| Stop | DVD |
| Fast forward | DVD |
| Rewind | DVD |
| Pause | DVD |
| Volume up | RCVR |
| Volume down | RCVR |
| Mute | RCVR |
| Channel up | SAT |
| Channel down | SAT |
| Input select | TV |

FIGURE 9

Sample history data. (User entered "AB" as start of desired sequence.)
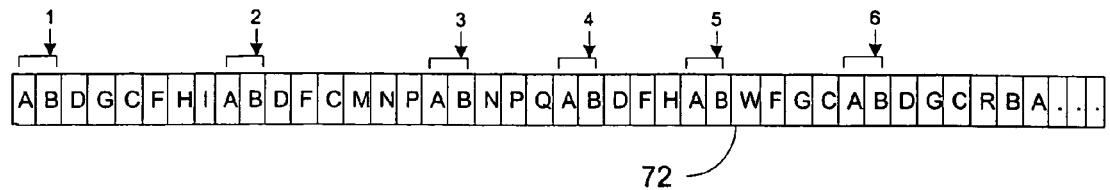
72
Iteration 1:
74a
| Pointer | Data value |
|---------|------------|
|         | N=1        |
| 1       | D          |
| 2       | D          |
| 3       | N          |
| 4       | D          |
| 5       | W          |
| 6       | D          |
 SORT
74b
| Pointer | Data value |
|---------|------------|
|         | N=1        |
| 1       | D          |
| 2       | D          |
| 4       | D          |
| 6       | D          |
| 3       | N          |
| 5       | W          |
} Discard (too short)
Iteration 2:
74c
| Pointer | Data value | |
|---------|------------|---|
|         | N=1        | N=2 |
| 1       | D          | G |
| 2       | D          | F |
| 4       | D          | F |
| 6       | D          | G |
 SORT
74d
| Pointer | Data value | |
|---------|------------|---|
|         | N=1        | N=2 |
| 2       | D          | F |
| 4       | D          | F |
| 1       | D          | G |
| 6       | D          | G |
FIGURE 16

Iteration 3:

74e

| Pointer | Data value | | |
|---|---|---|---|
| | N=1 | N=2 | N=3 |
| 2 | D | F | C |
| 4 | D | F | H |
| 1 | D | G | C |
| 6 | D | G | C |

SORT

74f

| Pointer | Data value | | |
|---|---|---|---|
| | N=1 | N=2 | N=3 |
| 2 | D | F | C |
| 4 | D | F | H |
| 1 | D | G | C |
| 6 | D | G | C |

Save "ABDF"

Iteration 4:

74g

| Pointer | Data value | | | |
|---|---|---|---|---|
| | N=1 | N=2 | N=3 | N=4 |
| 1 | D | G | C | F |
| 6 | D | G | C | R |

SORT

74h

| Pointer | Data value | | | |
|---|---|---|---|---|
| | N=1 | N=2 | N=3 | N=4 |
| 1 | D | G | C | F |
| 6 | D | G | C | R |

Save "ABDGC"

Iteration 5: Completion -- data table empty, all entries either discarded or saved.

Sequences found and saved: ABDF and ABDGC

FIGURE 16 (continued)

SYSTEM AND METHOD FOR USING KEYSTROKE DATA TO CONFIGURE A REMOTE CONTROL DEVICE

RELATED APPLICATION INFORMATION

This application is a divisional of and claims the benefit of U.S. application Ser. No. 10/254,363, filed Sep. 25, 2002 now U.S. Pat. No. 6,788,241, which application is incorporated herein by reference in its entirety.

BACKGROUND

This following relates generally to hand held electronic devices and, more particularly, relates to a system and method for using keystroke data to configure a remote control device.

Universal remote controls for controlling the operation of multiple, diverse home appliances are well known. In this regard, universal remote controls perform a valuable function by consolidating three, four, five, and more remote controls into one device. However, as more remotely controllable appliances enter the homes of consumers and the number of remotely controllable operations increase, the user interface of the universal remote control becomes increasingly more complex. This complexity arises from the need to provide more and more keys which are used to initiate the transmission of the control codes that control the increasing number of operations of the increasing number of home appliances. Disadvantageously, as the user interface of the universal remote control becomes more cluttered, the usability of the universal remote control diminishes. Accordingly, a need exists for a universal remote control having an improved user interface that simplifies the operation of the universal remote control and, as such, the remote operation of consumer appliances.

SUMMARY

In accordance with this need, described is a system and method for using keystroke data to configure a remote control device and, more specifically, the user interface of a remote control device to thereby simplify operation of the remote control device. For example, a command key, representative of an appliance function, may be correlated to a target appliance that is determined, as a function of the monitored key use, to be the most likely intended recipient of a command to perform that appliance function. An activity key may also be programmed so as to perform a series of actions that are representative of a sequence of monitored key uses.

A better understanding of the objects, advantages, features, properties and relationships of the invention will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the invention, reference may be had to preferred embodiments shown in the following drawings in which:

FIG. 8 illustrates an exemplary use table utilized in connection with the method of FIGS. 7 and 10;

FIG. 9 illustrates an exemplary assignment table utilized in connection with the method of FIGS. 7 and 10;

FIG. 16 illustrates an example in which the method of FIGS. 13 and 15 is used to suggest keystroke sequences which a user can select to be assigned to an activity key.

DETAILED DESCRIPTION

Figure 1:
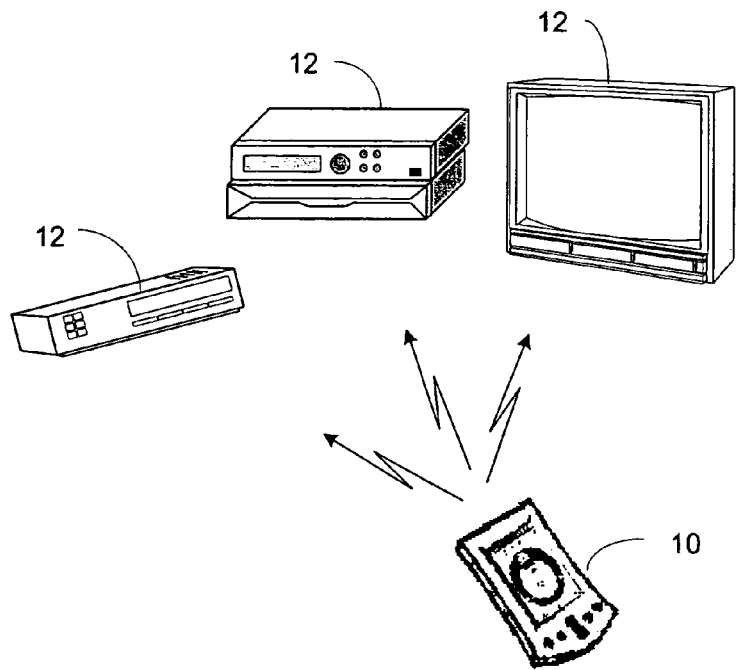
FIG. 1 illustrates a system including home appliances and a remote control device in which the principles of the invention may be employed.

Referring now to the figures, wherein like reference numerals refer to like elements, a system and method for using keystroke data to configure a remote control device 10 is illustrated. In accordance with the description that follows and by way of example only, the keystroke data may be used to configure a graphical user interface of the remote control device 10 to provide a simplified means for accessing command keys and/or for creating macros to control the functions of one or more home appliances 12. It will be appreciated that, as generally illustrated in FIG. 1, home appliances 12 may include, but are not limited to, televisions, VCRs, DVD players, Digital Video Recorders, home theater equipment, computers, audio equipment, game consoles, drapery, fans, stoves, or any device capable of or adapted to be controlled remotely.

Figure 17:
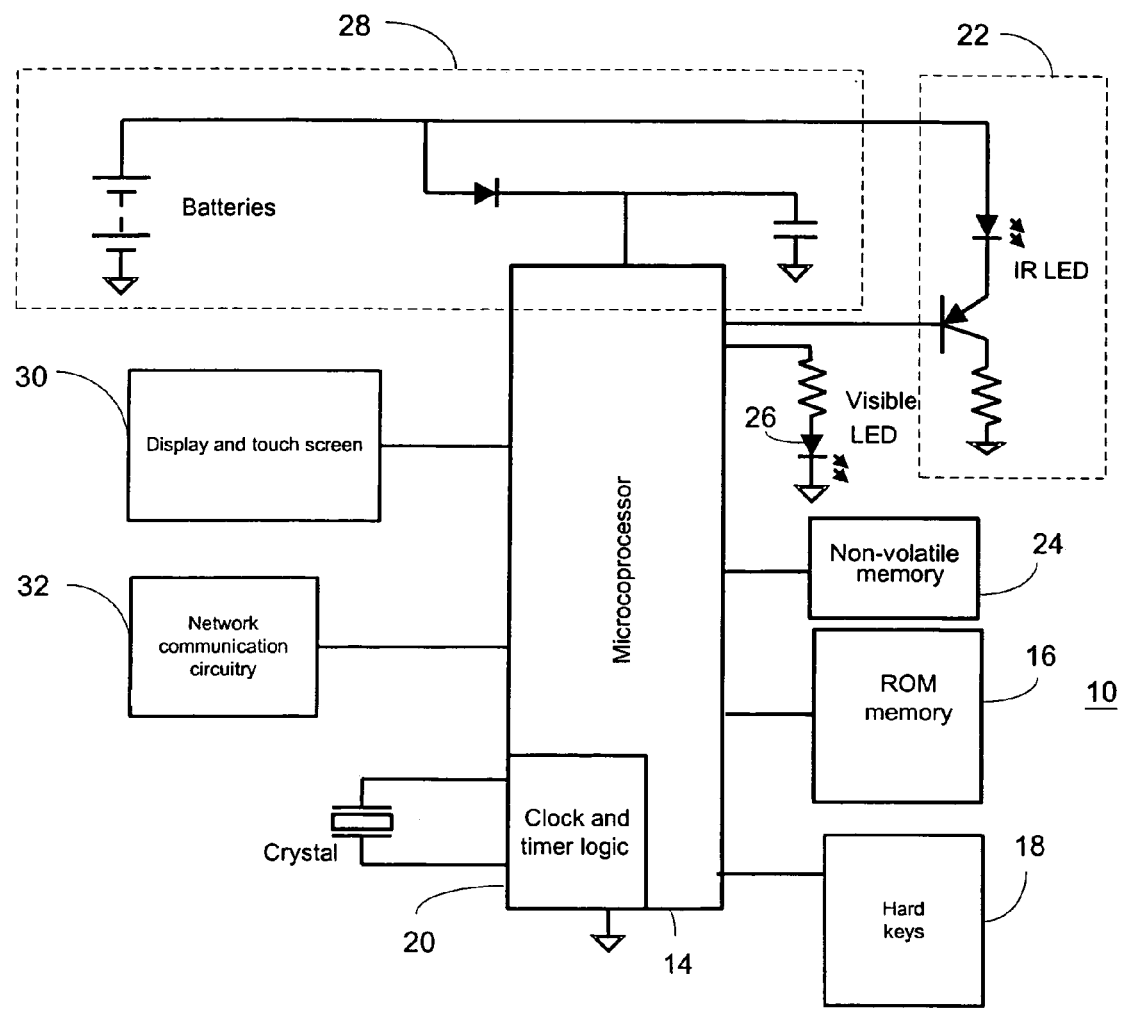
FIG. 17 illustrates a block diagram of an exemplary platform for the remote control device of FIG. 1.

Generally, the underlying platform for the remote control device 10, an example of which is illustrated in FIG. 17, may include a microprocessor 14 coupled to a ROM memory 16, a key matrix 18 in the form of physical buttons, an internal clock and timer 20, a transmission circuit 22, a non-volatile read/write memory 24, a visible LED 26 to provide visual feedback to the user, a power supply 28, a touch screen display 30, and I/O circuitry 32 for exchanging communications with an external computer. Representative platforms include, but are not limited to, devices such as Web tablets and/or PDAs manufactured by Compaq, HP, Palm, Visor, etc.

The ROM memory 16 typically includes executable instructions that are intended to be executed by the microprocessor 14 to control the operation of the remote control device 10. In this manner, the microprocessor 14 may be programmed to control the various electronic components within the remote control device 10 (e.g., to monitor power, to cause the transmission of signals, etc). Meanwhile, the non-volatile read/write memory 24, for example an EEPROM, battery-backed up RAM, "Smart Card," memory stick, or the like, allows user entered setup data and parameters, software applications, downloaded data, etc. to be stored as necessary. While the memory 16 is illustrated and described as a ROM memory, memory 16 can be comprised of any type of computer-readable media, such as ROM, RAM, SRAM, FLASH, EEPROM, or the like. Preferably, the memory 16 is also non-volatile or battery-backed such that data is not required to be reloaded after battery changes. In addition, the memories 16 and 24 may take the form of a chip, a hard disk, a magnetic disk, and/or an optical disk without limitation.

For commanding the operation of home appliances 12 of different makes, models, and types, the memory 16 may include a command code library. The command code library is comprised of a plurality of command codes that may be transmitted from the remote control device 10 for the purpose of controlling the operation of a home appliance 12. The memory 16 may also includes instructions which the microprocessor 14 uses in connection with the transmission circuit 22 to cause the command codes to be transmitted in a format that is recognizable by an identified home appliance 12. While the transmission circuit 22 preferably utilizes infrared transmissions, it will be appreciated that other forms of wired or wireless transmissions may also be used. Similarly, the I/O circuitry 32 can allow for wired or wireless communications (e.g., RF or IR) using any conventionally available communications protocol.

To identify home appliances 12 by type and make (and sometimes model) such that the remote control device 10 is adapted to transmit command codes in the format appropriate for such identified home appliances 12, data may be entered into the remote control device 10. Since methods for setting up a remote control to control the operation of specific home appliances 12 are well-known, they will not be described in greater detail herein. For additional information pertaining to remote control setup, the reader may turn to U.S. Pat. Nos. 5,614,906 and 4,959,810 which are incorporated herein by reference in their entirety.

To cause the remote control device 10 to perform an action, the remote control device 10 is adapted to be responsive to events, such as a sensed user interaction with one or more keys on the key matrix 18, user interaction with the touch screen display 30, receipt of a signal from an external source such as a remote computer, etc. More specifically, in response to an event, appropriate instructions within the memory 16 are executed. For example, when a hard or soft command key is activated on the remote control device 10, the remote control device 10 may read a command code corresponding to the activated command key from the memory 16 and transmit the command code to a home appliance 12 in a format recognizable by the home appliance 12. It will be appreciated that the instructions within the memory 16 can be used not only to cause the transmission of command codes to home appliances 12 but also to perform local operations. While not limiting, local operations that may be performed by the remote control device 10 include favorite channel setup, manual macro button setup, command function key relocation, etc. Examples of local operations can be found in U.S. Pat. Nos. 5,481,256, 5,959,751, 6,014,092, which are incorporated herein by reference in their entirety.

The platform illustrated in the block diagram of FIG. 17 comprises a general purpose, processor system which is controllable by software. The software may include routines, programs, objects, components, and/or data structures that perform particular tasks that can be viewed as an operating system together with one or more applications. The operating system, such as the "Windows CE" brand operating system or the like, provides an underlying set of management and control functions which are utilized by the applications to offer user functions such as control of home appliances. In further embodiments, applications can be provided for use in accessing Internet data, displaying TV guide information, and the like. It should be understood that, while the term "remote control" is used herein to designate the physical unit, in terms of the internal software architecture the conventional "clicker" remote control user interface is but one of several possible applications which may co-exist within the universal remote control device 10.

To provide a means to interact with the remote control device 10, the software of the remote control device 10 provides a graphical user interface. Generally, the graphical user interface may be displayed on an LCD touch screen 30 such that activation of a displayed icon or soft key generates an event to control the operation of the remote control device 10. Alternatively, the graphical user interface may be used to provide labels for hard keys on the platform which hard keys may be activated to generate an event to control the operation of the remote control device 10.

Figures 2A, 2B, 2C:
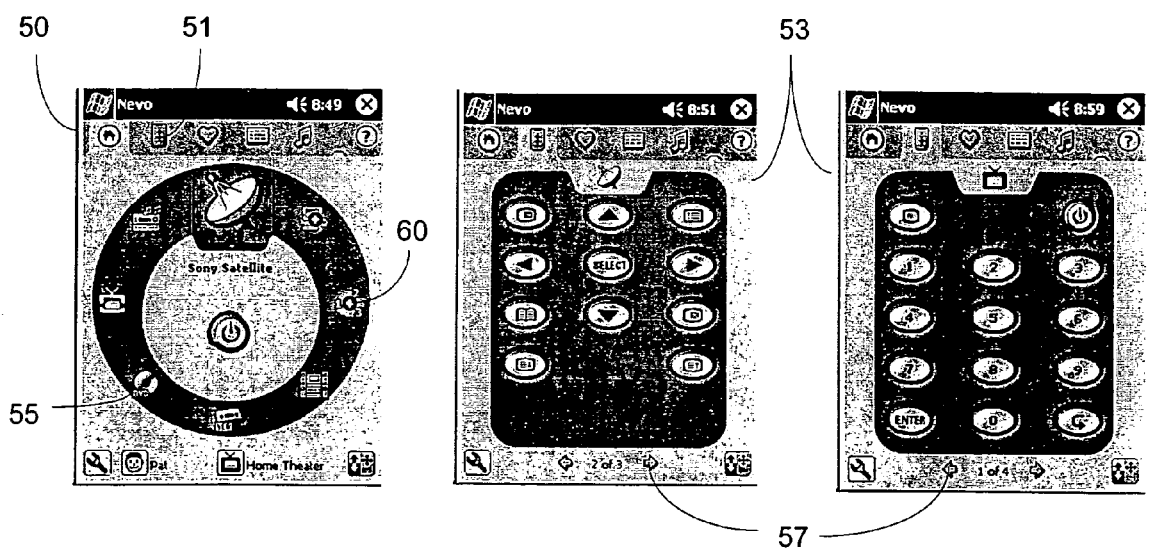
FIGS. 2–5 illustrate an exemplary graphical user interface for use in commanding the operation of the remote control device and the home appliances.

An exemplary graphical user interface system is described in pending U.S. Application 60/264,767, 60/334,774, and 60/344,020 which are incorporated herein by reference in their entirety. Generally, as illustrated in FIG. 2a, the graphical user interface provides a page 50 by which the user can command the device to perform an activity or to place the remote control device 10 into a mode to control the operation of one or more home appliances 12. It is to be understood that a setup application may be invoked to setup this page as well as the remote control device 10 so that the remote control device 10 is configured to send the appropriate commands to designated home appliance(s) 12. Customization can be provided using menu-driven applications which cooperate with the graphical user interface application to provide a user with the means to enter setup information. For example, a device setup application can be used to configure the remote control device 10 to allow a user to access all of the infrared control codes required to operate the functions of an entire home electronics system. Control codes may be pre-stored in the memory 16 and/or memory 24, learned into the memory 24 by using a remote control that was supplied with a home appliance, or downloaded from a remote source, e.g., from a source via the Internet, and loaded into memory 24.

In the examples illustrated in the various figures, the home page 50 displays a circular queue of icons that are representative of appliances and/or activities. In response to a user selecting an appliance icon 55, the remote control device 10 enters a device mode that corresponds to the selected appliance icon to thereby allow for the transmission of command codes for controlling the functions of the appliance that has been linked to the selected icon. It will be appreciated that, when the remote control device 10 is in a device mode, the remote control device 10 may still be configured to transmit commands for controlling the operation of other home appliances (e.g., if the remote control device 10 was setup to perform volume/channel punch through, etc.). In response to a user selecting an activity icon, the remote control device 10 performs one or more actions that have been linked to the selected icon, for example, to transmit a sequence of command codes to control one or more functions of one or more appliances, i.e., perform a macro. The graphical user interface may also cause the display to move (in the illustrated case it will rotate) until the selected icon is displayed at a predetermined location within the circular queue, for example, at the top of the wheel.

For further enhancing the ease of use of the remote control device 10, the graphical user interface provides a remote control icon 51, illustrated in FIG. 2*a*, which allows the user to command the universal remote control device 10 to display one or more device specific pages 53 that present command keys by which a user may instruct the remote control device 10 to transmit commands to control the functions of the home appliance that corresponds to the current mode of operation. An exemplary device specific page 53 having command keys for use in sending commands to a satellite system is illustrated in FIG. 2*b* and an exemplary device specific page 53 having command keys for use in sending commands to a television is illustrated in FIG. 2*c*. Since multiple pages 53 may be associated with a mode of operation, it is preferred that only one device specific page 53 be displayed and the user be provided with a means, such as arrows 57, whereby a user may select to navigate between pages 53 for a specific device.

Figure 3A:
Figure 3B:
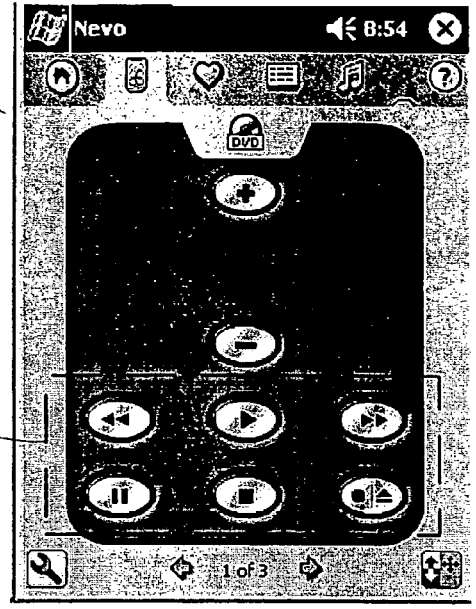
Figure 4A:
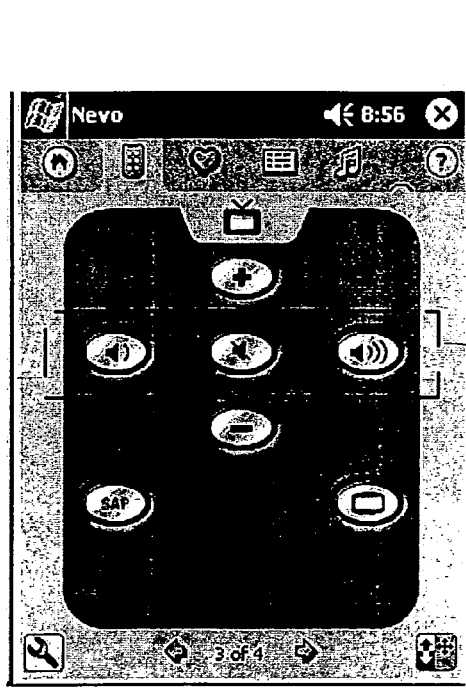
Figure 4B:

In some circumstances, it will be appreciated that the device specific pages 53 corresponding to the various device modes may have command keys that are used to command similar operations of the various target home appliances 12. For example, a device specific page 53 for controlling the operations of a VCR, illustrated in FIG. 3*a*, and a device specific page 53 for controlling the operation of a DVD player, illustrated in FIG. 3*b*, may both have command keys 52 that are provided to allow a user to cause the transmission of transport commands (e.g., play, FF, REW, etc.) from the remote control device 10 to the target appliance 12. Similarly, a device specific page 53 for controlling the operations of a TV, illustrated in FIG. 4*a*, and a device specific page 53 for controlling the operations of an A/V device, illustrated in FIG. 4*b*, may both have command keys 54 that are provided to allow a user to cause the transmission of volume control commands (e.g., volume up, volume down, mute) from the remote control 10 to the target appliance 12.

Figure 5:
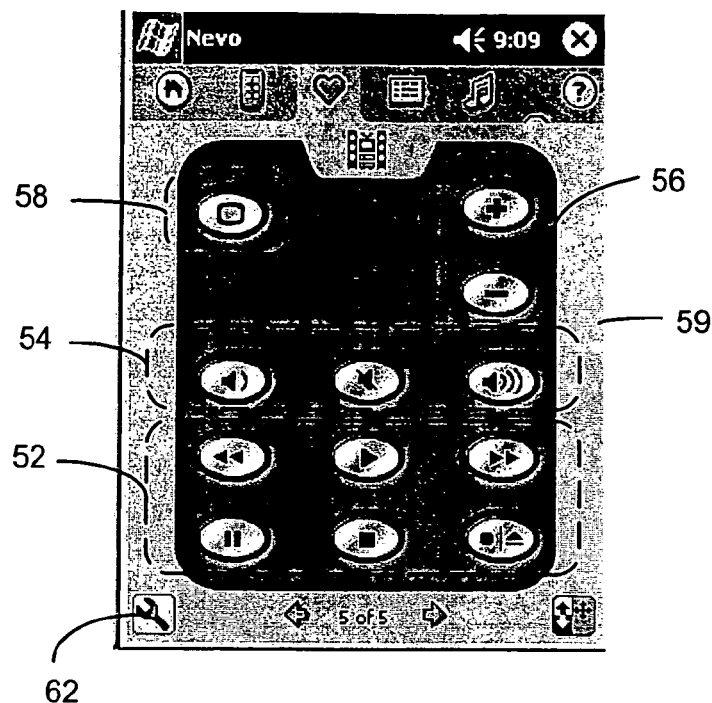

To provide further ease of use, the remote control 10 may support a means for allowing a user to create a page or pages that present a set of command keys for commanding the operation of multiple target appliances, hereinafter referred to as a home theater page 59. As will be appreciated, the home theater page 59 allows the user to command the functions of one or more appliances without the need to toggle between device modes. For example, as illustrated in FIG. 5, a home theater page 59 may allow a user to group command keys that are used to cause the transmission of commands to control transport functions 52, volume functions 54, channel changing functions 56, input selection functions 58, etc. in disparate appliances. The target appliance for the command key functions (i.e., which command codes are to be transmitted in response to selection of a particular command key) may be predetermined or manually specified by the user during a set-up process.

Figure 6:
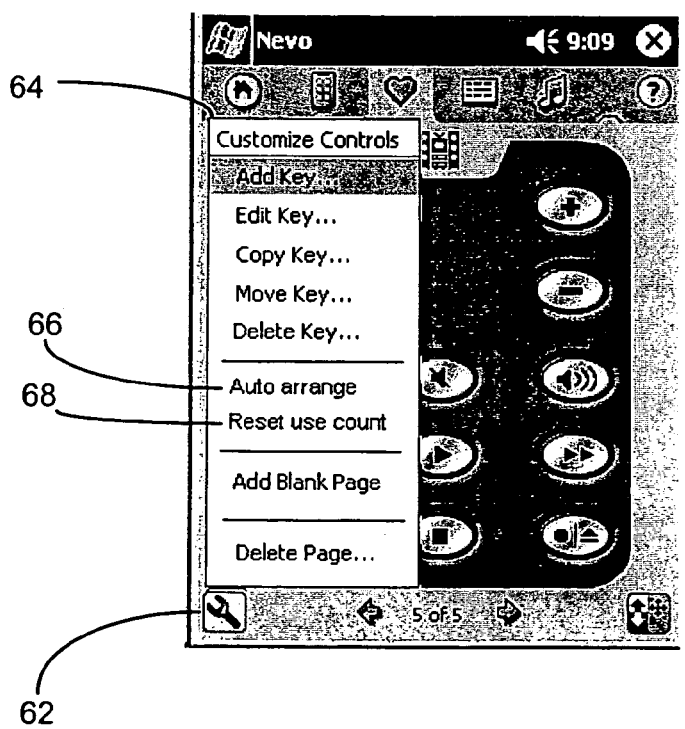
FIG. 6 illustrates an exemplary graphical user interface menu having options by which a user can request to configure features of the remote control device.

To allow for the automatic set-up of the home theater page 59, an automatic setup option may be made available to a user. The automatic set-up option may be accessed, for example, by a user selecting a setup icon 62 which results in the display of a menu 64 of set-up options as illustrated in FIG. 6. Within the set-up menu, local functions such as "add a key," "delete a key," etc. are available. As will be appreciated, these menu options are provided to allow for the manual addition, deletion, etc. of a command key within the home theater page 59. Within the set-up menu 64 may also be displayed an automatic set-up option, illustrated as the "auto arrange" menu item 66 in FIG. 6.

In response to the user selecting the auto arrange menu item 66, the command keys illustrated in FIG. 5 may be automatically configured to transmit command codes to a specific target device. Thus, by way of example, selecting the "auto arrange" menu item 66 may result in the transport function command keys 52 being configured to transmit commands to a target DVD player, the channel function command keys 56 being configured to transmit commands to a target satellite system, the volume function command keys 54 being configured to transmit commands to a target A/V receiver, etc. The target device for an activated function command key may be determined by, for example, accumulating frequency of use data for the function command keys during operation of the remote control 10 (e.g., by monitoring activation of function command keys from device specific pages 53 as well as from the home theater page 59).

Figure 7:
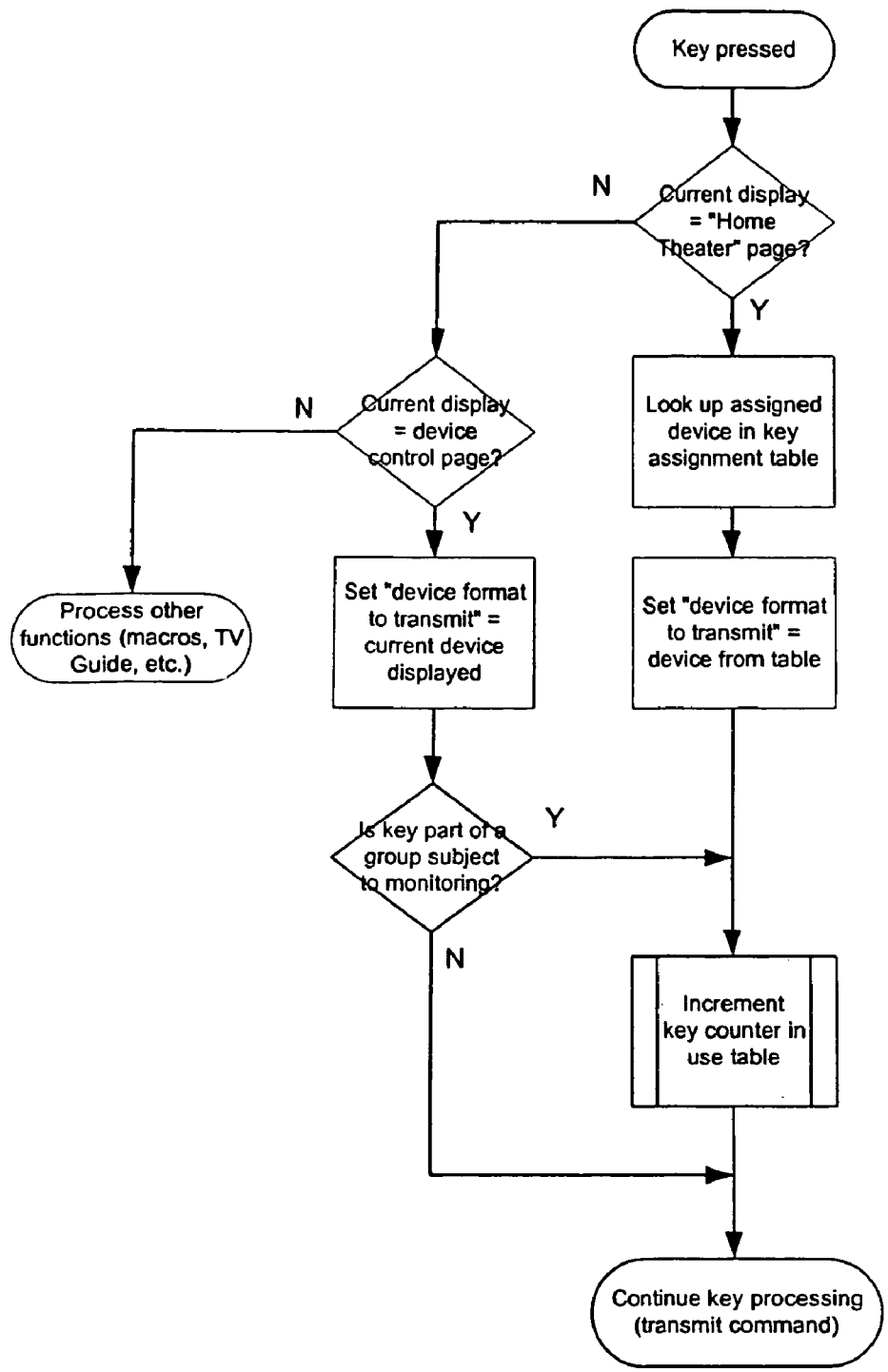
FIGS. 7 and 10 illustrate an exemplary method for using keystroke data to configure the operation of function command keys of the remote control device.

To accumulate frequency of use data, the remote control device 10 may, as illustrated in FIG. 7, monitor keystrokes to determine if a function command key being activated is in a device specific page 53 and to determine if the function command key being activated is one for which data is to be accumulated. If the remote control device 10 determines that the function command key activated is one in a device specific page 53 and one for which data is to be accumulated, the remote control device 10 increments a counter for that function command key for the intended target appliance (i.e., the appliance to which the function command is transmitted). An exemplary use table that includes function command key counts for various function command key/appliance pairs is illustrated in FIG. 8. In circumstances where a device does not support a function, e.g., a TV failing to support a transport function, no use count is maintained for that function for that device as indicated by the "X" in the use table. As described below, the use table is utilized to update a key assignment table, an example of which is illustrated in FIG. 9, when a user invokes the automatic set-up function from the set-up menu 64. As illustrated in FIG. 7, activation of a command key in the home theater page may also cause the incrementing of the use count for a function command key/appliance pair.

Generally, the key assignment table provides a correlation between a function command key in the home theater page 59 and a target appliance to which the corresponding function command is to be transmitted. Prior to invocation of the automatic set-up, the key assignment table may have a predetermined correlation between the function command keys in the home theater page 59 and a target appliance (i.e., it may be user set, factory set, etc.). Thus, when a function command key in the home theater page 59 is activated, the key assignment table is read and the target appliance to which the function command key has been correlated is used to determine how a command code(s) is to be formatted for transmission to the intended target appliance.

Figure 10:
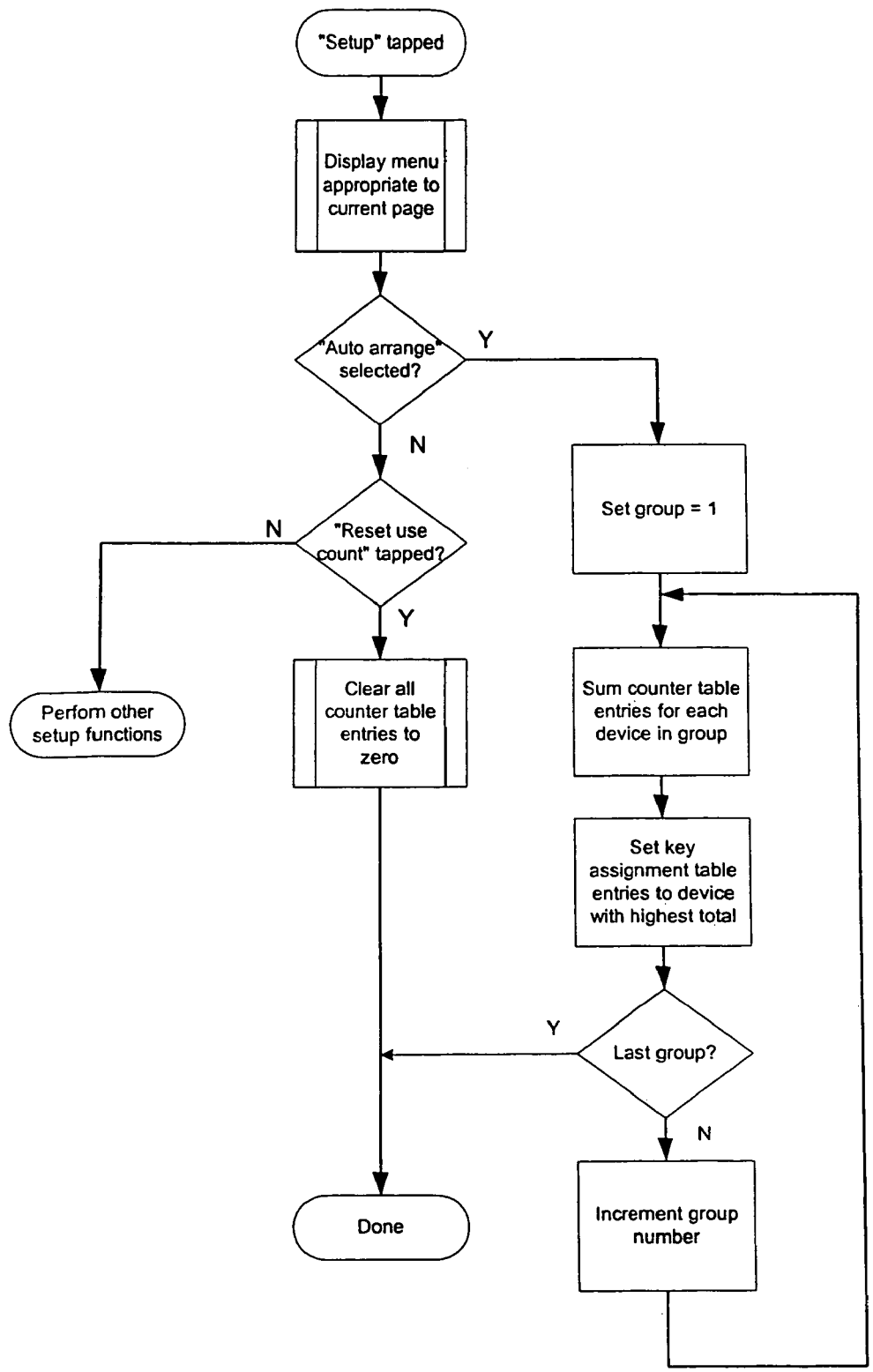

When determining which target appliance is to be correlated to a function command key in the key assignment table when the automatic set-up function is selected by a user, the automatic assignment process may make use of the total number of times function command keys have been activated for a target appliance within a logical group of function command keys (e.g., transport functions, volume functions, etc.) as illustrated in FIG. 10. The target appliance having the highest sum total of function command key activations over such a logical group would then be correlated to all of the function command keys for that logical group within the assignment table. For example, with reference to FIGS. 8 and 9, since the DVD player was the target appliance to which the most transport function commands were transmitted (i.e., the DVD player has the largest sum total of key activations or uses over the function keys in logical group 1), each of the transport function keys in the key assignment table is correlated to the DVD player. The consideration of function key groups is desired since this prevents the anomalous mixing of devices within one logical group of functions, e.g., where all the transport keys are assigned to the DVD player with the exception of the "rewind" function which would have been assigned to the VCR if function keys were considered individually in the example illustrated in FIG. 8. However, in some cases, consideration on a single function key basis would be desirable. Accordingly, while the correlation process was described in the context of function key groups, it will be appreciated that function keys can be assigned on an individual basis also using this methodology. Furthermore, if the use table indicates that no one target device is preferred over another, the configuration of the home theater keys may remain unchanged as a result of performing this process.

To allow for the resetting of the use table, the set-up menu may also list a "reset" option 68 the selection of which by a user would act to zero the entries in the use table. This may be desirable in situations where a user needs to change appliance designations within the remote control 10. At this time, while not required, it may also be desired to reset the key assignment table so as to correlate function keys to predetermined, default appliances. As noted, the predetermined correlations could be user set, factory set, etc. In addition, it is contemplated that the predetermined appliance correlations may change as the remote control is set-up to control various appliances. For example, the predetermined appliance for the transport function keys may be a VCR if the remote control 10 is configured to control a VCR and, if control of a DVD player is later added to the remote control 10, the predetermined appliance correlation may then be changed to the DVD player, i.e., the correlation of function keys, or group of functions keys, defaults to the last added appliance that supports those functions prior to and after resetting of the auto-configure operation.

Figure 11:
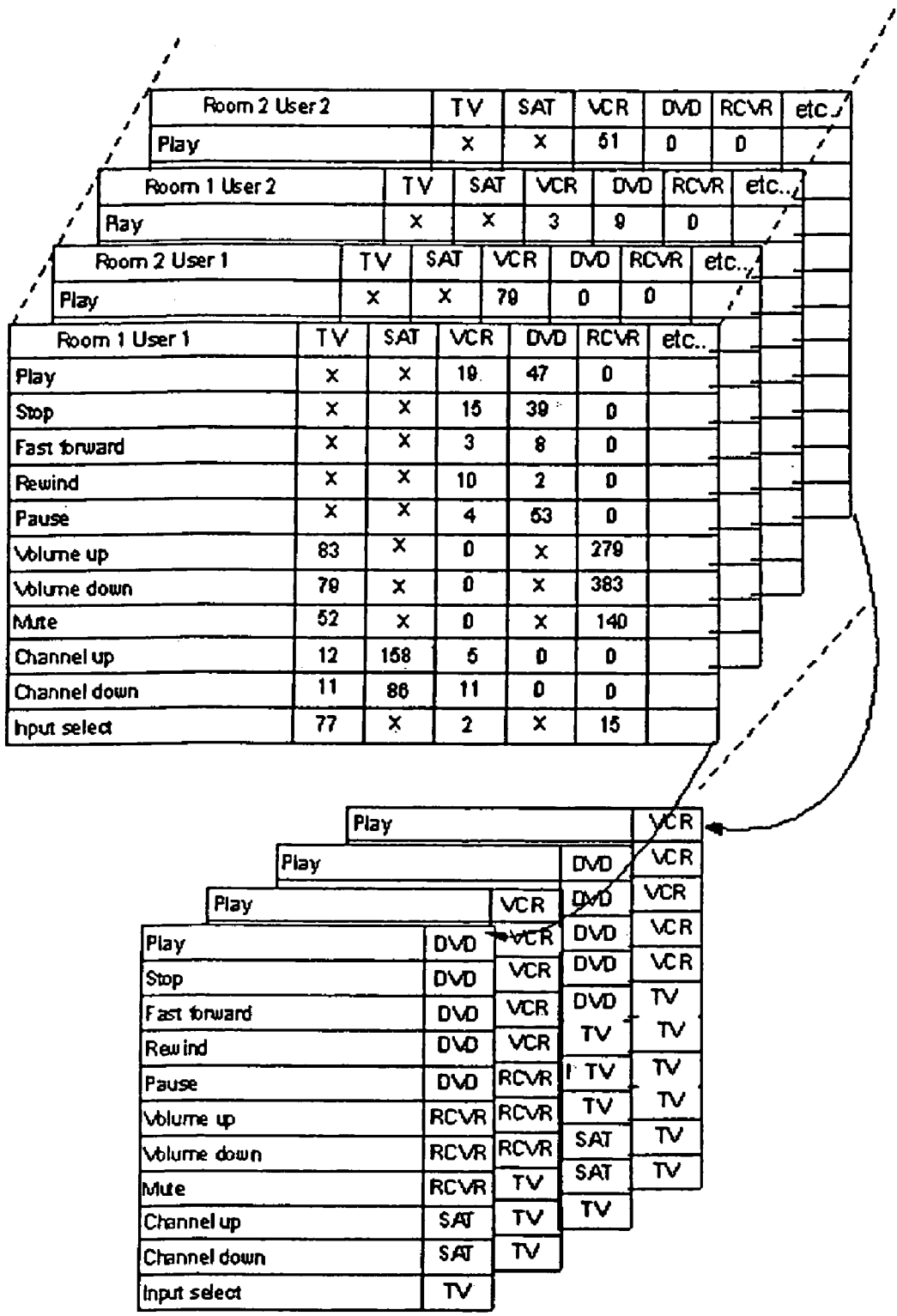
FIG. 11 illustrates exemplary use tables and corresponding assignment tables in a remote control that supports multiple configurations.

In circumstances where the remote control device 10 is configured to support multiple configurations, i.e., for different rooms and/or users, a home theater page 59 can be established for each of the different rooms and/or users. In this case, as illustrated in FIG. 11, each room and/or user home theater page 59 would have a corresponding use table and assignment table which would be populated according to the methodologies described above.

While described in the context of soft command keys, it will be appreciated that the methods described above can also be used to correlate appliances with hard keys. Furthermore, while described in the context of a home theater page in which the function command keys are predetermined, it will be appreciated that the methods described above can be easily modified to support correlating appliances to a dynamic home theater page, i.e., one in which function command keys are added or deleted. In this case, it will be understood that the use table and key assignment table would also be dynamic to support any function command keys added to the home theater page. It will also be appreciated that the remote control will know, from the command code library for example, which functions are supported by an added target device and, accordingly, if the use table should be expanded to allow for the tracking of activations of that function for that device. It will be further appreciated that the use table can be consulted to suggest the automatic addition of one or more function command keys to the home theater page 59. For example, when a user elects to add a function command key to the home theater page 59, the use table can be examined and if a function command key/device pair have a value that meets some predetermined threshold value, indicating that the function command key for that device is activated often, the remote control device 10 can suggest that that function command key (or group of function command keys that logically includes the function command key) be added to the home theater page(s) 59. If such a suggestion is followed, the key assignment table may also be updated to reflect a correlation between the added function command key(s) and the corresponding appliance.

Still further, accumulated keystroke use data may be utilized to automatically assist in configuring hard keys and/or soft key activity icons (collectively referred to hereinafter as activity keys) of the remote control device 10. By way of example, configuration of an activity key may commence with the user selecting an activity key that is available for configuration, for example, the activity icon 60 illustrated in FIGS. 2a and 12a. In response to the user requesting to configure the activity key, the remote control device 10 may invoke an Activity Wizard, as illustrated in FIGS. 12b–12k, that functions to guide a user through the process of defining an activity which will be associated with the activity key when the configuration process is complete. In this manner, when the configured activity key is later activated, the defined activity is repeated by the remote control device 10. The Activity Wizard may provide a means for a user to manually define the activity, for example, to manually define a sequence of keystrokes as a macro to be associated with the activity key. The Activity Wizard may also provide a means to assist in the definition of the activity. In the discussion that follows, the described activity will be a macro, i.e., a series of activities that are to be performed by the remote control device in response to activation of a single activity key.

Figure 12:
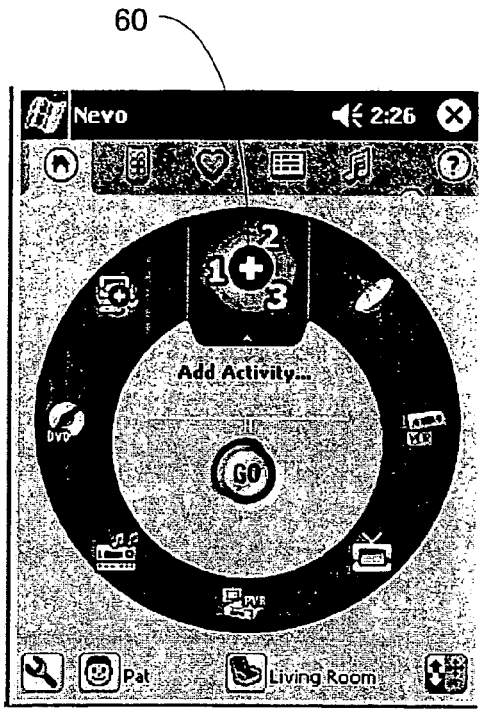
FIGS. 12a–12l illustrate an exemplary graphical user interface by which activity keys may be configured in the remote control device.
Figure 12:
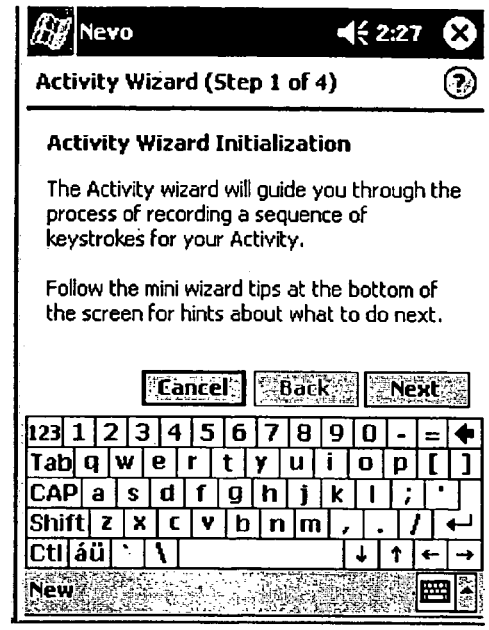
Figure 12:
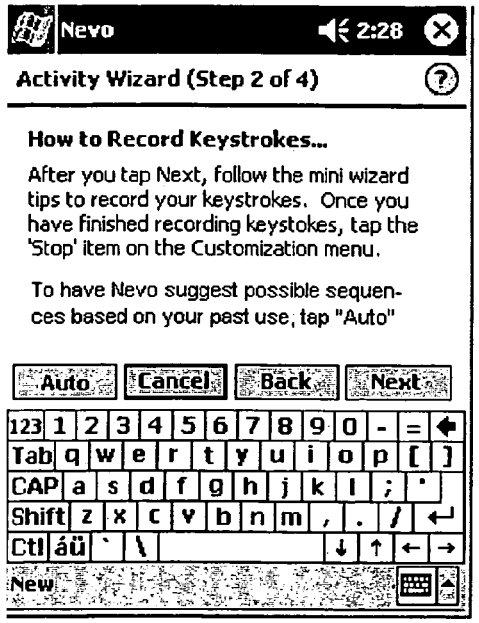
Figure 12:
Figure 12:
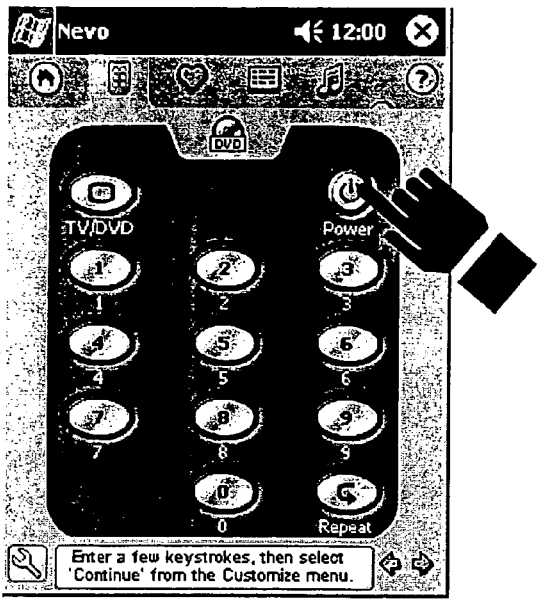
Figure 12:
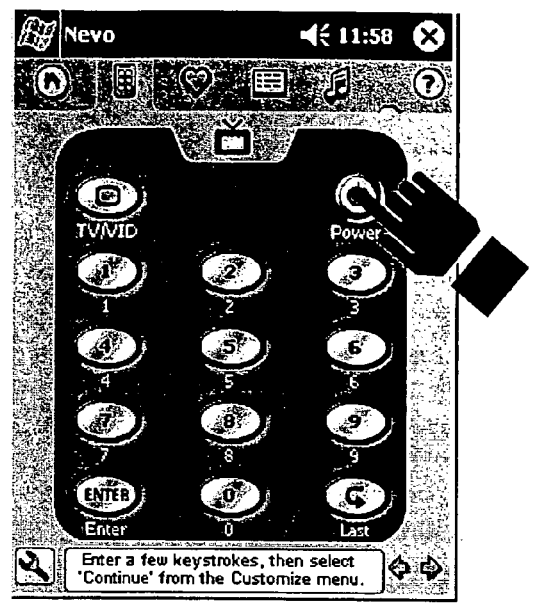
Figure 12:
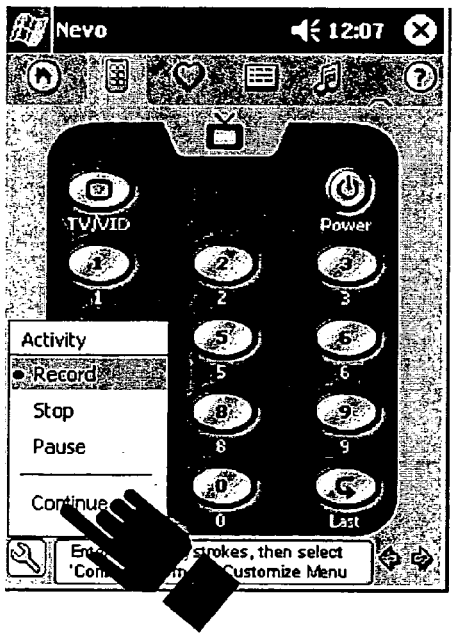
Figure 12:
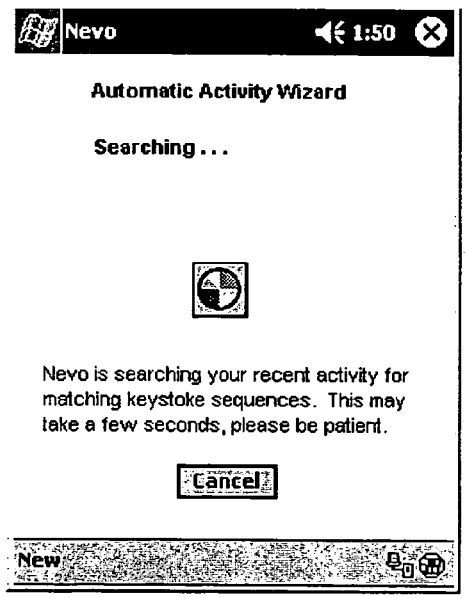
Figure 12:
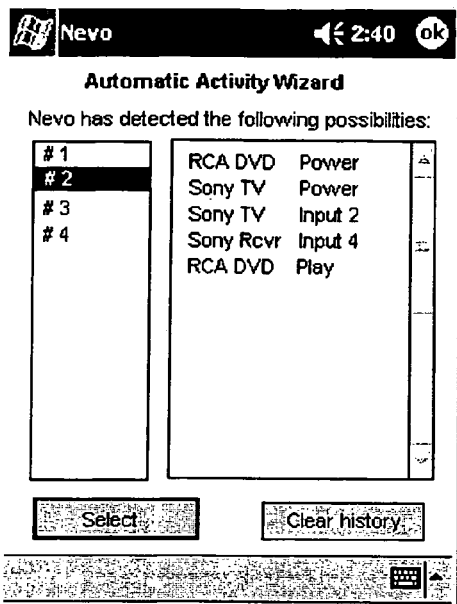
Figure 12:
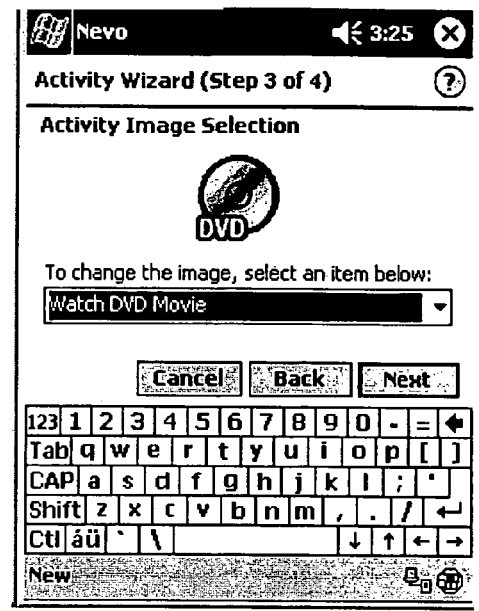
Figure 12:
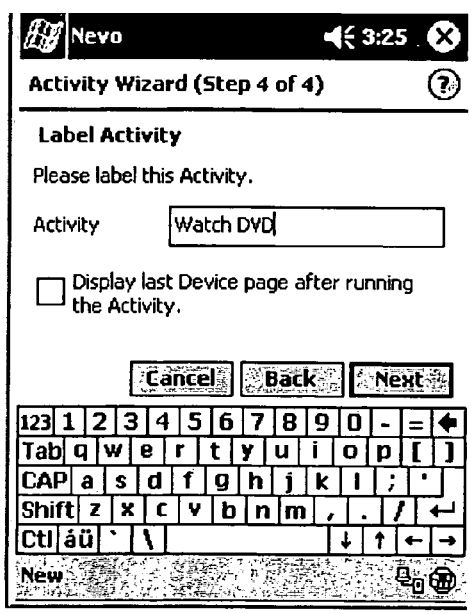
Figure 12:
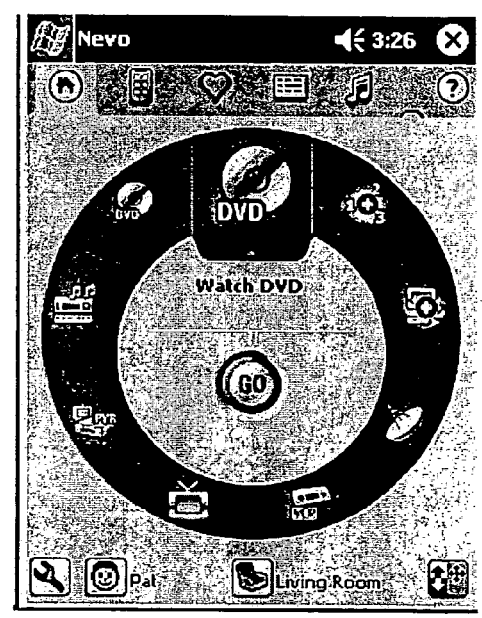

To enter a mode where the remote control device 10 assists in defining a macro, the user may select the "auto" item presented within the Activity Wizard, illustrated in FIG. 12c. In response to this selection, the remote control device 10 may first prompt the user to enter one or more keystrokes that define the start of a macro sequence, as illustrated in FIG. 12d. By way of example, the user may enter the keystrokes "DVD power" (illustrated in FIG. 12e) followed by "TV power" (illustrated in FIG. 12f) and then indicate that the initial entry is complete, for example by selecting "continue" as illustrated in FIG. 12g. The remote control device 10 may then commence a search within a history file for sequences of keystrokes that begin with the entered keystrokes (e.g., "DVD power" followed by "TV power"). During this search, the graphical user interface may display the page illustrated in FIG. 12h.

Figure 13:
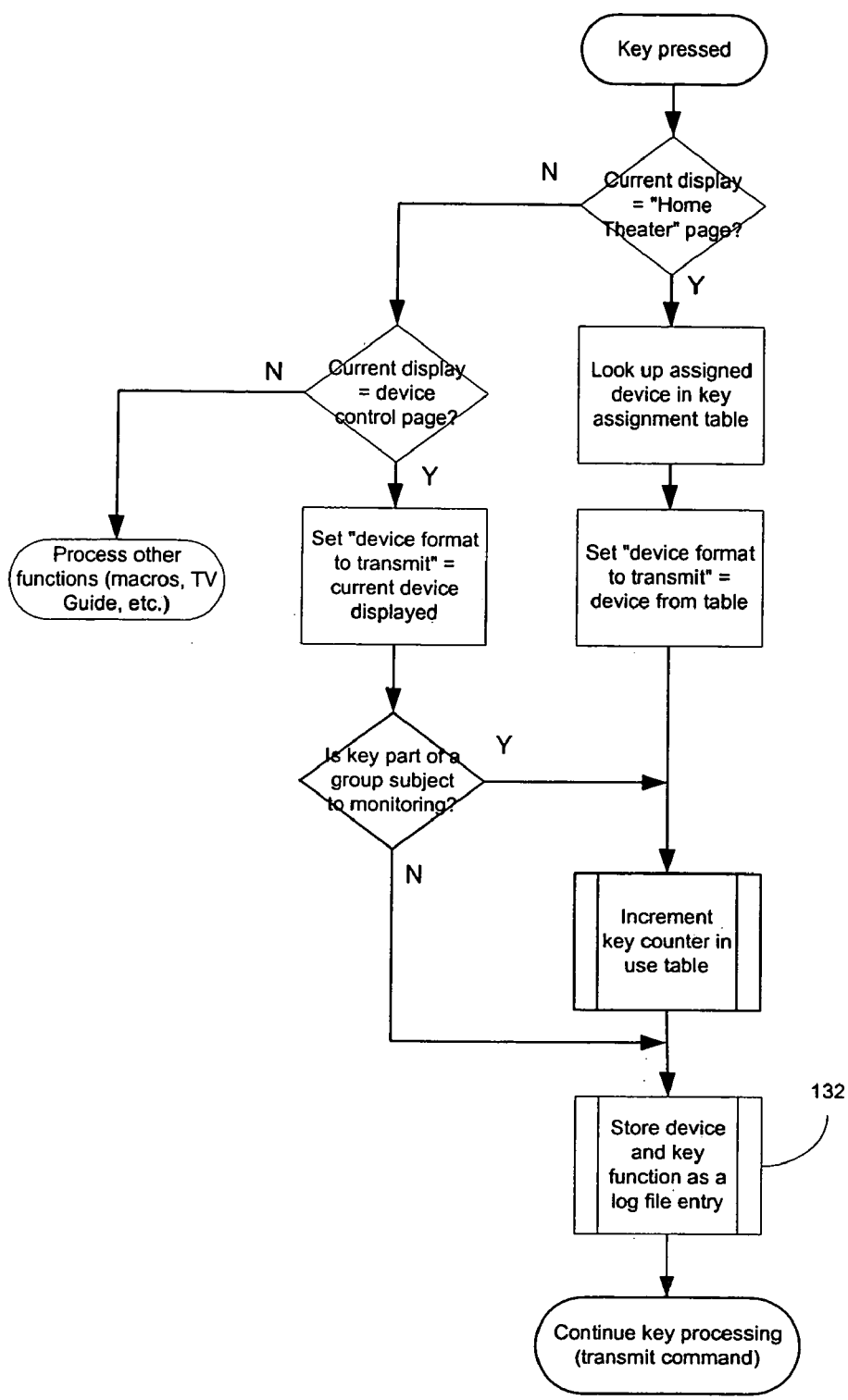
FIGS. 13 and 15 illustrate an exemplary method by which activity keys may be configured in the remote control device.
Figure 14:
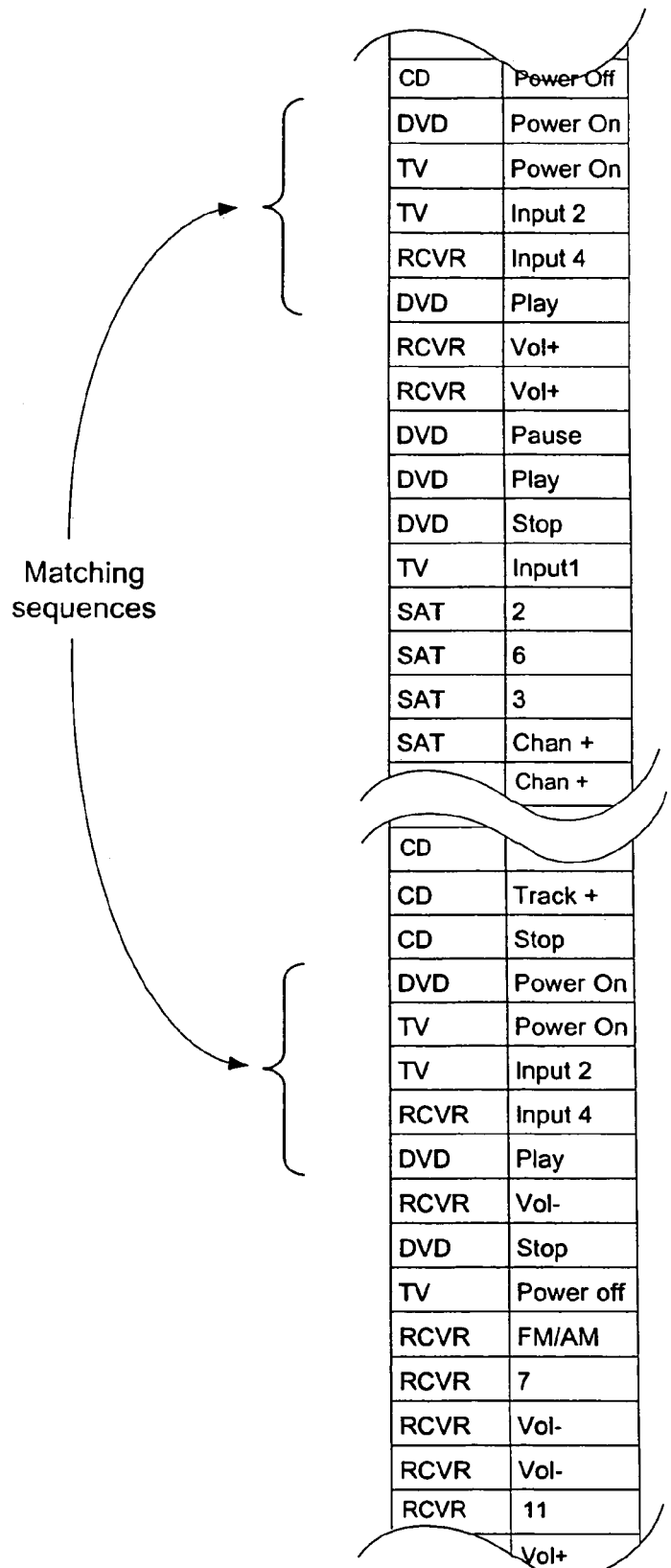
FIG. 14 illustrates an exemplary history data file for use in connection with the method of FIGS. 13 and 15.

To populate the history file that is searched in the performance of this process, the keystroke capture method described above may be utilized with an additional step 132 being used, as illustrated in FIG. 13, that functions to store the activated key (which may be stored so as to indicate a target device and function(s) to be performed) as a history file entry. An exemplary history file, in which the device and key function pairs are listed in the order in which they occurred, is illustrated in FIG. 14. In this manner, the history file contains the raw data resource which is searched for repetitive sequences by the automatic macro generation application.

The size of the history file may be selected taking into account factors such as available memory, anticipated use, desired speed of processing, etc. As an example, if 400 keystrokes occur per day and two bytes of storage are required for each keystroke, then keystroke activity over the course of a week may be stored in under 3,000 entries (under 6 KB) and activity over the course of a month may be stored in under 12,000 entries (under 24 KB). Thus, even if separate history files are maintained by user and/or by location (e.g., room), data storage demands would not be deemed to be excessive. Regardless of the memory size selected, when the memory area allocated becomes full, the history data file may simply wrap upon itself such that it always contains the most recent data. It will also be appreciated that the keystrokes that are recorded may be filtered to eliminate those which are unlikely to form part of a desirable sequence—e.g., minor volume adjustments, continued sequences of channel adjustments, etc.—either as a standard default or as a user configurable option.

It will be further appreciated that, while the actual amount of data within the history file is not great when measured by the standards of today, searching through the history file may nevertheless be time consuming. This is especially true in a system with limited processing capability as is likely to be found in the platform of the remote control device 10, even when using known algorithms for searching strings of data such as the Boyer-Moore searching algorithm (See BOYER R. S., MOORE, J. S., 1977, A Fast String Searching Algorithm. *Communications of the ACM.* 20:762–772).

For improving the searching capabilities within the remote control device 10, two possible approaches are provided. First, keystroke history data can be pre-processed as a background task (i.e., when the device is otherwise idle) in anticipation of future user requests (e.g., to find keystroke sequences that oft repeated which can then be suggested to the user as a proposed macro). Second, as noted above, the user may provide a starting keystroke(s) as a beginning point for the search.

Figure 15:
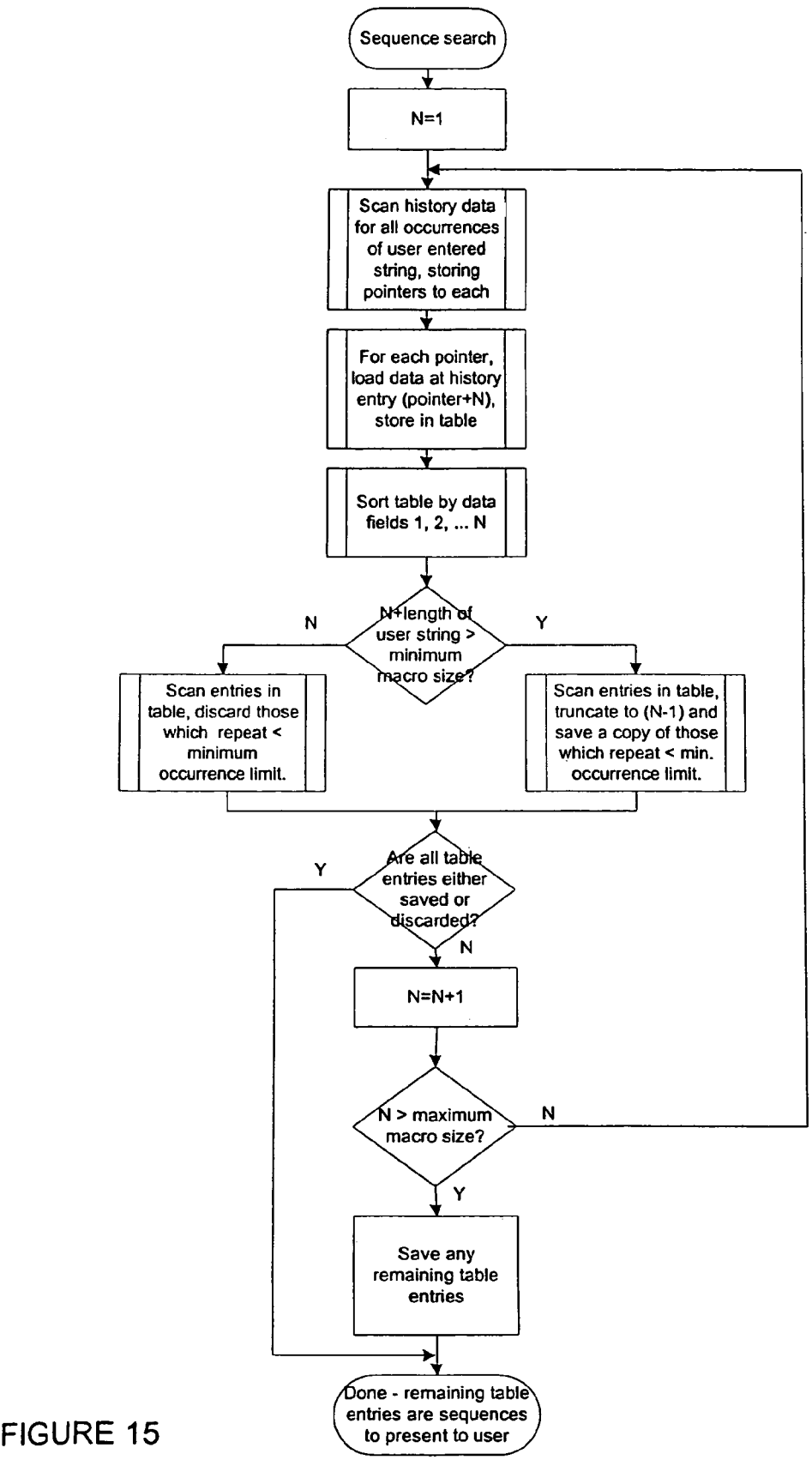

In the case where the user provides a starting keystroke(s), the search program commences by scanning the entire history file for occurrences of the keystroke(s) entered by the user, as illustrated in FIG. 15. For each occurrence of the user entered keystroke(s) that was identified in the history file, the search program then examines the first data value that immediately follows the identified keystroke(s) and sorts this data by frequency of appearance. This procedure may then be repeated using the second data value that immediately follows the first data value, the third data value that immediately follows the second data value, etc. until either no further commonalities are found, the maximum permitted macro size has been reached, etc.

Once this procedure has been completed, the possible keystroke sequences that may be of interest to the user have been identified and can be presented to the user for selection and assignment to the activity key, as illustrated in FIG. 12*i*. With respect to deciding which found keystrokes sequences should be presented to a user for selection, factors such as lower and upper limits on the size of the sequences and the frequency of appearance of the sequences in the history file may be considered. The lower limit presupposes that it would not be worthwhile to have a macro that performs only two or three keystrokes and thus reduces the number of results to be reviewed by the user at the conclusion of the search process. The upper limit prevents the scanning process from becoming too lengthy. The frequency of appearance prevents the presentation of sequences that only occurred a few times. It will be appreciated that the frequency of appearance of an entire keystroke sequence corresponds to the lowest frequency of appearance for a keystroke within the sequence as determined according to the description set forth above. The values for these factors can be present or user-adjustable.

By way of further example, FIG. 16 illustrates the operation of the algorithm. In this illustrated example, for the sake of brevity, each user keystroke value is represented by a letter wherein "DVD power" might be "A," "TV power" might be "B," etc. A sample segment of a history file 72 is also shown along with pointers 1–6 resulting from an initial scan of the data using the starting keystrokes "A" and "B." In the illustrated example, six possible sequences have been identified (i.e., as indicated by pointers 1–6). FIG. 16 also illustrates a data table 74 that is updated for each iteration through the loop of FIG. 15. In this example, the selection parameters are set as follows: min_size=3 and min_occurrences=2.

In the performance of the first iteration (N=1), the content of the data table 74*a*, which is sorted in data table 74*b*, shows that keystroke "D" follows the keystrokes "A" and "B" four different times within the history file (i.e., at 1, 2, 4 and 6). Each of keystrokes "N" and "W" follows the keystrokes "A" and "B" a single time within the history file (i.e., at 3 and 5 respectively). Since the keystroke sequence pointed to by pointers 3 and 5 fail to have the requisite number of occurrences (e.g., the sequence has a keystroke that occurs less that two times following the sequence of "A" then "B") and fails to have the requisite keystroke sequence length (e.g., when the offending keystroke is eliminated from consideration, since it failed to have the requisite frequency, a sequence of "A" and "B" results which is less than three) the keystroke sequences pointed to by pointers 3 and 5 are discarded from further consideration.

In FIG. 16 is illustrated the data tables 74*c*–74*h* for iterations 2 through 4. In the illustrated example, after the second iteration and sorting (N=2), all of the entries remain viable (i.e., at least two identical set of each sequence exists—"ABDF" and "ABDG"). After the third iteration and sorting (N=3), it can be seen that the entries corresponding to pointers 2 and 4 have now become unique (i.e., they include a keystroke that gives the sequence a frequency of occurrence that is less that the requisite frequency) so the sequence is no longer considered in further iterations, it is truncated to the N=2 state, and the truncated sequence is saved as an identified sequence "ABDF" which may be presented to the user for selection. After the fourth iteration and sorting (N=4), the entries corresponding to pointers 1 and 6 have now become unique so these sequences are also removed from further consideration, they are truncated to the N=3 state, and the truncated sequence is saved as an identified sequence "ABDGC" which may be presented to the user for selection. Since no data table entries remain for consideration after iteration four, the process terminates at the fifth iteration having identified two sequences of keystrokes to present to the user for selection. It will be appreciated by those skilled in the art that while the illustrated example of FIG. 16 shows the actual data values physically rearranged at each step (i.e., data table 74*b*, 74*d*, 74*f*, etc.) this is for ease of explanation only: in practice it may be more efficient leave the data values in their original locations and effect the sorting process via the manipulation of tokens or pointers to the data.

To allow a user to easily browse the found keystroke sequences that fit within the given search result factors, the keystroke sequences can be listed in an order, for example, that is determined as a function of their frequency of appearance, by length, etc. Each keystroke in the sequence can also be displayed and a means provided for a user to edit a keystroke sequence (e.g., add, delete, or change the order). The system may also provide a means for the user to select an icon for the activity key (in the event that it is a soft key) and label the activity key to which the keystroke sequence is to be assigned, as illustrated in FIGS. 12*j*–12*k*. The system may also provide a means to clear the history file.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A method for configuring a remote control device, comprising:

storing a sequence of activations of keys of the remote control device;

searching the stored sequence to select one or more sequence subsets;

presenting the selected sequence subsets to a user; and allowing a user to assign one of the selected sequence subsets to an activity key whereby, in response to a subsequent activation of the activity key, the remote control performs actions in accordance with assigned, selected sequence subset.

2. The method as recited in claim 1, wherein the sequence subsets are selected as a function of their frequency of occurrence within the stored sequence.

3. The method as recited in claim 2, wherein the selected sequence subsets include at least a minimum number of activations of keys.

4. The method as recited in claim 2, wherein the selected sequence subsets have at least a minimum number of occurrences within the stored sequence.

5. The method as recited in claim 3, wherein the minimum number of activations of keys is user definable.

6. The method as recited in claim 4, wherein the minimum number of occurrences is user definable.

7. The method as recited in claim 1, wherein presenting the selected sequence subsets includes displaying for each selected sequence subset the activations of keys that comprise the selected sequence subset.

8. The method as recited in claim 7, further comprising accepting user input to modify a displayed selected sequence subset.

9. The method as recited in claim 8, wherein the modification comprises changing the order of the activations of keys that comprises a selected sequence subset.

10. The method as recited in claim 8, wherein the modification comprises removing an activation of a key included in a selected sequence subset.

11. The method as recited in claim 8, wherein the modification comprises adding an activation of a key to a selected sequence subset.

12. The method as recited in claim 1, wherein the step of storing the sequence of activations of keys further includes the step of first filtering said key activations in order to exclude certain functions.

13. A method for configuring a remote control device, comprising:

storing a sequence of activations of keys of the remote control device;

accepting user input representative of one or more activations of keys of the remote control device;

searching the stored sequence to select one or more sequence subsets that include the activations of keys represented by the user input;

presenting the selected sequence subsets to a user; and allowing a user to assign one of the selected sequence subsets to an activity key whereby, in response to a subsequent activation of the activity key, the remote control performs actions in accordance with assigned, selected sequence subset.

14. The method as recited in claim 13, wherein the sequence subsets are selected as a function of their frequency of occurrence within the stored sequence.

15. The method as recited in claim 14, wherein the selected sequence subsets include at least a minimum number of activations of keys.

16. The method as recited in claim 14, wherein the selected sequence subsets have at least a minimum number of occurrences within the stored sequence.

17. The method as recited in claim 15, wherein the minimum number of activations of keys is user definable.

18. The method as recited in claim 16, wherein the minimum number of occurrences is user definable.

19. The method as recited in claim 13, wherein presenting the selected sequence subsets includes displaying for each selected sequence subset the activations of keys that comprise the selected sequence subset.

20. The method as recited in claim 19, further comprising accepting user input to modify a displayed selected sequence subset.

21. The method as recited in claim 20, wherein the modification comprises changing the order of the activations of keys that comprises a selected sequence subset.

22. The method as recited in claim 21, wherein the modification comprises removing an activation of a key included in a selected sequence subset.

23. The method as recited in claim 20, wherein the modification comprises adding an activation of a key to a selected sequence subset.

24. The method as recited in claim 13, wherein storing the sequence of activations of keys further includes filtering said key activations in order to exclude certain functions.

25. A computer readable media encoded with instructions for configuring a remote control device, the instructions performing steps comprising:

storing a sequence of activations of keys of the remote control device;

searching the stored sequence to select one or more sequence subsets;

presenting the selected sequence subsets to a user; and allowing a user to assign one of the selected sequence subsets to an activity key whereby, in response to a subsequent activation of the activity key, the remote control performs actions in accordance with assigned, selected sequence subset.

26. The computer readable media as recited in claim 25, wherein the sequence subsets are selected as a function of their frequency of occurrence within the stored sequence.

27. The computer readable media as recited in claim 26, wherein the selected sequence subsets include at least a minimum number of activations of keys.

28. The computer readable media as recited in claim 26, wherein the selected sequence subsets have at least a minimum number of occurrences within the stored sequence.

29. The computer readable media as recited in claim 27, wherein the minimum number of activations of keys is user definable.

30. The computer readable media as recited in claim 28, wherein the minimum number of occurrences is user definable.

31. The computer readable media as recited in claim 25, wherein presenting the selected sequence subsets includes displaying for each selected sequence subset the activations of keys that comprise the selected sequence subset.

32. The computer readable media as recited in claim 31, wherein the instructions further provide for accepting user input to modify a displayed selected sequence subset.

33. The computer readable media as recited in claim 32, wherein the modification comprises changing the order of the activations of keys that comprises a selected sequence subset.

34. The computer readable media as recited in claim 32, wherein the modification comprises removing an activation of a key included in a selected sequence subset.

35. The computer readable media as recited in claim 32, wherein the modification comprises adding an activation of a key to a selected sequence subset.

36. The computer readable media as recited in claim 25, wherein the storing the sequence of activations of keys further includes filtering said key activations in order to exclude certain functions.

* * * * *